United States Patent
Teutsch et al.

(10) Patent No.: US 9,732,196 B2
(45) Date of Patent: Aug. 15, 2017

(54) ADHESIVE FOR BONDING POLYIMIDE RESINS

(75) Inventors: Erich Otto Teutsch, Pittsfield, MA (US); Craig Milne, Pittsfield, MA (US)

(73) Assignee: SABIC GLOBAL TECHNOLOGIES B.V., Bergen Op Zoom (NL)

( * ) Notice: Subject to any disclaimer, the term of this patent is extended or adjusted under 35 U.S.C. 154(b) by 141 days.

(21) Appl. No.: 13/467,751

(22) Filed: May 9, 2012

(65) Prior Publication Data

US 2012/0321879 A1  Dec. 20, 2012

Related U.S. Application Data

(63) Continuation-in-part of application No. 13/104,877, filed on May 10, 2011.

(51) Int. Cl.
 *B32B 7/12* (2006.01)
 *C08J 5/12* (2006.01)
 (Continued)

(52) U.S. Cl.
 CPC ............ *C08J 5/128* (2013.01); *B32B 5/02* (2013.01); *B32B 7/12* (2013.01); *B32B 27/065* (2013.01); *B32B 27/08* (2013.01); *B32B 27/281* (2013.01); *B32B 27/365* (2013.01); *C09J 5/06* (2013.01); *C09J 169/00* (2013.01); *C09J 183/10* (2013.01); *B32B 2266/0214* (2013.01); *C08G 77/448* (2013.01); *C08J 2379/08* (2013.01); *C08J 2469/00* (2013.01); *C09J 2469/00* (2013.01); *C09J 2479/086* (2013.01); *Y10T 428/249921* (2015.04); *Y10T 428/249991* (2015.04);
 (Continued)

(58) Field of Classification Search
 CPC ... B32B 7/12; B32B 9/046; B32B 27/04; B32B 27/281; B32B 2307/306
 USPC .................. 442/136, 149, 164, 221
 See application file for complete search history.

(56) References Cited

U.S. PATENT DOCUMENTS 3,875,116 A    4/1975   Heath et al.
4,604,329 A *   8/1986   Reber ............................ 428/620
(Continued)

FOREIGN PATENT DOCUMENTS

CN         1333998 A     1/2002

OTHER PUBLICATIONS

14 CFR 25.853—Compartment Interiors.
CAS No. 148935-94-8.
Chinese Office Action.

*Primary Examiner* — Andrew Piziali
(74) *Attorney, Agent, or Firm* — Cantor Colburn LLP

(57) ABSTRACT

One embodiment relates to an, article and a method for producing an article including a plurality of substrates, and an adhesive bonded between at least two of the plurality of substrates. The adhesive can include a polycarbonate copolymer that includes reacted resorcinol, siloxane, and bisphenol-A. Another embodiment relates to an article having a first polyimide substrate, a second polyimide substrate, and an adhesive bonded between the first substrate and the second substrate. The article can have a 2 minute integrated heat release rate of less than or equal to 65 kilowatt-minutes per square meter ($kW-min/m^2$) and a peak heat release rate of less than 65 kilowatts per square meter ($kW/m^2$) as measured using the method of FAR F25.4, in accordance with Federal Aviation Regulation FAR 25.853(d).

9 Claims, 1 Drawing Sheet

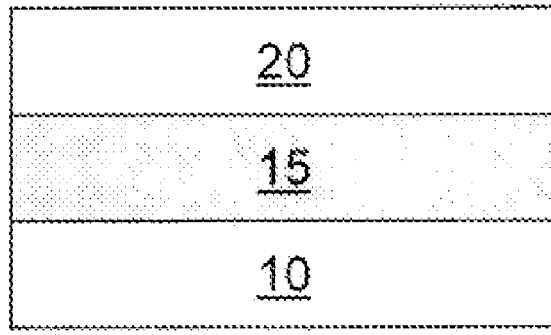

(51) Int. Cl.

| | |
|---|---|
| *C09J 5/06* | (2006.01) |
| *C09J 169/00* | (2006.01) |
| *C09J 183/10* | (2006.01) |
| *B32B 27/06* | (2006.01) |
| *B32B 27/08* | (2006.01) |
| *B32B 27/28* | (2006.01) |
| *B32B 27/36* | (2006.01) |
| *B32B 5/02* | (2006.01) |
| *C08G 77/448* | (2006.01) |

(52) U.S. Cl.
CPC .... *Y10T 428/266* (2015.01); *Y10T 428/31507* (2015.04); *Y10T 428/31721* (2015.04)

(56) References Cited

U.S. PATENT DOCUMENTS

| | | | |
|---|---|---|---|
| 4,690,997 A | | 9/1987 | Cella et al. |
| 4,808,686 A | | 2/1989 | Cella et al. |
| 4,910,078 A | * | 3/1990 | Hill et al. .................. 442/77 |
| 4,943,594 A | * | 7/1990 | Ezawa et al. .............. 521/79 |
| 5,229,482 A | | 7/1993 | Brunelle |
| 5,503,745 A | * | 4/1996 | Ogata et al. ............. 210/490 |
| 6,355,723 B1 | | 3/2002 | van Baal et al. |
| 6,861,482 B2 | * | 3/2005 | Brunelle et al. ............ 525/439 |
| 6,919,422 B2 | | 7/2005 | Gallucci et al. |
| 6,989,190 B2 | * | 1/2006 | Gaggar ................. C08L 69/00 428/220 |
| 7,041,773 B2 | | 5/2006 | Gallucci et al. |
| 7,790,292 B2 | | 9/2010 | Colborn et al. |
| 8,017,699 B1 | * | 9/2011 | Sanner et al. ............ 525/422 |
| 2007/0027271 A1 | | 2/2007 | Davis et al. |
| 2010/0272976 A1 | | 10/2010 | Ashton et al. |

\* cited by examiner

| 20 |
|----|
| 15 |
| 10 |

ADHESIVE FOR BONDING POLYIMIDE RESINS

CROSS-REFERENCE TO RELATED APPLICATIONS

This application is a continuation-in-part of U.S. patent application Ser. No. 13/104,877, filed on May 10, 2011, which is hereby incorporated by reference in its entirety.

FIELD OF THE INVENTION

The invention relates generally to an adhesive for bonding polyimide resins, and more specifically to an adhesive comprising a polycarbonate copolymer comprising reacted resorcinol, siloxane, and bisphenol-A.

BACKGROUND OF THE INVENTION

Polyimide resins, such as those commercially available as ULTEM® brand resins, have excellent Flame, Smoke and Toxicity (FST) properties and mechanical properties and high temperature capability, but are difficult to bond and retain the FST requirements that are critical as for aircraft, marine and some rail applications. Bonding of sheets of polyimide foam for transportation applications or for radome construction where further machining and the retention of electrical properties such as uniform radar transparency are important is also difficult. Production of interior aircraft panels requires the application of decorative films over large areas, which requires additional time in the mold to develop a high strength bond for current adhesive systems adding time and cost to production, especially if the adhesive has a limited shelf-life. Many of the existing adhesives require high temperature cures, degrade the flame, smoke and toxicity performance or produce a gummy line when additional machining is performed at the bond line.

There are a number of adhesives that can be used for bonding polyimideresin in its various forms, but many of those adhesives have only limited applicability since they fail to meet all but a few of the criteria. Most of the melt adhesives are based on flammable polymers, such as polyvinyl acetate, functionalized polyesters, etc. Such adhesives contribute sufficient fuel and even smoke and toxic combustion products and frequently adhere primarily through mechanical bonding. In the case of polyimide foam, bonding with these adhesives would require sufficient material to fill the open surface cells, providing even more fuel. Polyurethanes are highly effective adhesives but they give off toxic chemicals while burning. Epoxies are similar to the polyurethanes in that they may provide excellent adhesion but epoxy adhesives can be very smoky and require extended cure time thus extending production time. Epoxy adhesives also have limited shelf life and may require refrigerated storage. Phenolic adhesives may provide very low fuel, but generally require high temperature cure and they have limited shelf life.

For critical applications, large blocks of foam had to be chosen from materials that could be made into larger blocks and then machined or bonded. Any inconsistencies in electrical properties, such as inconsistent radar wave absorption, are problems that would have to be compensated for electrically or by use of additional devices.

Therefore, there is a need for an adhesive capable of bonding polyimide resin containing materials to each other where the adhesive has excellent Flame, Smoke and Toxicity (FST) properties, excellent electrical properties, as well as excellent mechanical properties. Such adhesives show great utility when used to bond polyimide materials to each other, and/or bond materials to polyimide resins.

BRIEF SUMMARY OF THE INVENTION

A first embodiment relates to an article comprising a plurality of substrates, and an adhesive bonded between at least two of the plurality of substrates, wherein the adhesive comprises a polycarbonate copolymer comprising reacted resorcinol, siloxane, and bisphenol-A. A second embodiment relates to an article comprising a first polyimide substrate; a second polyimide substrate; and an adhesive bonded between the first substrate and the second substrate, wherein the article has a 2-minute integrated heat release rate of less than or equal to 65 kilowatt–minutes per square meter (kW–min/m2) and a peak heat release rate of less than 65 kilowatts per square meter (kW/m2) as measured using the method of FAR F25.4, in accordance with Federal Aviation Regulation FAR 25.853(d).

A third embodiment relates to an adhesive comprising a polycarbonate copolymer comprising reacted resorcinol, siloxane, bisphenol-A. The adhesive of this embodiment may take the form of a hot-melt adhesive, a film, or a woven or non-woven fabric. The adhesive does not affect electrical properties, has no shelf-life limitation, and can be made available in a broad range of colors. The adhesive can be machined after bonding.

A fourth embodiment relates to a method comprising bonding a first substrate to a second substrate with an adhesive comprising a polycarbonate copolymer comprising reacted resorcinol, siloxane, and bisphenol-A.

A fifth embodiment relates to a method comprising bonding of polymers and materials other than polyimides to each other. In such an embodiment, the adhesive can be used to bond non-polyimide containing substrates or other materials together.

BRIEF DESCRIPTION OF THE DRAWINGS

FIG. 1 is a schematic representation of two pieces of polyimide foam bonded by the adhesive of the invention.

DETAILED DESCRIPTION OF THE INVENTION

The invention is based on the remarkable discovery that by using an adhesive comprising a polycarbonate copolymer comprising reacted resorcinol, siloxane, and bisphenol-A, it is now possible to form articles article comprising a plurality of substrates, and an adhesive bonded between at least two of the plurality of substrates. Particularly useful substrates are polyimide substrates that include certain polyetherimides and polyetherimide copolymers.

The present invention may be understood more readily by reference to the following detailed description of preferred embodiments of the invention as well as to the examples included therein. All numeric values are herein assumed to be modified by the term "about," whether or not explicitly indicated. The term "about" generally refers to a range of numbers that one of skill in the art would consider equivalent to the recited value (i.e., having the same function or result). In many instances, the term "about" may include numbers that are rounded to the nearest significant figure. All percentages are weight percentages, unless otherwise indicated.

The invention described herein addresses all of the above limitations at least for any of the polyimide resin grades, including those commercially available as the ULTEM® brand resin and polyetherimide copolymer (EXTEM®) brand resin grades.

Polycarbonate copolymers suitable for the invention include any polycarbonate copolymer, which when used in accordance to the invention, produces an adhesive composition exhibiting the desired flame, smoke and toxicity properties. A preferred polycarbonate copolymer is polysiloxane copolymer composition comprises arylate-containing units that may comprise aromatic carbonate units. The aromatic carbonate units may also be referred to as polycarbonate units. As used herein, the terms "polycarbonate", "polycarbonate resin", and "polycarbonate unit" mean a composition having repeating structural carbonate units of the formula (1):

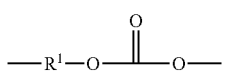 (1)

in which greater than or equal to 60 percent of the total number of $R^1$ groups are aromatic organic groups and the balance thereof are aliphatic or alicyclic groups. The aromatic organic groups may be derived from dihydroxy aromatic compounds, including resorcinols or bisphenols. In an embodiment, each $R^1$ is a $C_{6-30}$ arylene group. In another embodiment, each $R^1$ is a group of the formula (2):

$$-A^1-Y^1-A^2- \qquad (2)$$

wherein each of $A^1$ and $A^2$ is a monocyclic divalent aryl group and $Y^1$ is a bridging group having one or two atoms that separate $A^1$ from $A^2$. In an exemplary embodiment, one atom separates $A^1$ from $A^2$. Illustrative non-limiting examples of bridging groups of this type are —O—, —S—, —S(O)—, —S(O)$_2$—, —C(O)—, methylene, cyclohexylmethylene, 2-[2.2.1]-bicycloheptylidene, ethylidene, isopropylidene, neopentylidene, cyclohexylidene, cyclopentadecylidene, cyclododecylidene, and adamantylidene. The bridging group $Y^1$ may be a hydrocarbon group or a saturated hydrocarbon group such as methylene, cyclohexylidene, or isopropylidene. In another embodiment, $Y^1$ is a carbon-carbon bond (—) connecting $A^1$ and $A^2$. An example of an $R^1$ of formula (2) that has a carbon-carbon bond connecting $A^1$ and $A^2$ is the group derived from 4,4'-biphenol. In an embodiment, the $R^1$ groups are desirably minimally substituted with hydrocarbon-containing substituents such as, for example, alkyl, alkoxy, or alkylene substituents.

As used herein, the term "alkyl" refers to a straight or branched chain monovalent hydrocarbon group; "alkylene" refers to a straight or branched chain divalent hydrocarbon group; "alkylidene" refers to a straight or branched chain divalent hydrocarbon group, with both valences on a single common carbon atom; "alkenyl" refers to a straight or branched chain monovalent hydrocarbon group having at least two carbons joined by a carbon-carbon double bond; "cycloalkyl" refers to a non-aromatic monovalent monocyclic or multicyclic hydrocarbon group having at least three carbon atoms, "cycloalkylene" refers to a non-aromatic alicyclic divalent hydrocarbon group having at least three carbon atoms, with at least one degree of unsaturation; "aryl" refers to an aromatic monovalent group containing only carbon in the aromatic ring or rings; "arylene" refers to an aromatic divalent group containing only carbon in the aromatic ring or rings; "alkylaryl" refers to an aryl group that has been substituted with an alkyl group as defined above, with 4-methylphenyl being an exemplary alkylaryl group; "arylalkyl" refers to an alkyl group that has been substituted with an aryl group as defined above, with benzyl being an exemplary arylalkyl group; "acyl" refers to a an alkyl group as defined above with the indicated number of carbon atoms attached through a carbonyl carbon bridge (—C(=O)—); "alkoxy" refers to an alkyl group as defined above with the indicated number of carbon atoms attached through an oxygen bridge (—O—); and "aryloxy" refers to an aryl group as defined above with the indicated number of carbon atoms attached through an oxygen bridge (—O—).

Unless otherwise indicated, each of the foregoing groups may be unsubstituted or substituted, provided that the substitution does not significantly adversely affect synthesis, stability, or use of the compound. The term "substituted" as used herein means that any at least one hydrogen on the designated atom or group is replaced with another group, provided that the designated atom's normal valence is not exceeded. When the substituent is oxo (i.e., =O), then two hydrogens on the atom are replaced. Also as used herein, the term "combination" is inclusive of blends, mixtures, alloys, reaction products, and the like. Combinations of substituents and/or variables are permissible provided that the substitutions do not significantly adversely affect synthesis or use of the compound.

Polysiloxane copolymers may be produced by any suitable method such as by the the interfacial reaction of dihydroxy aromatic compounds having the formula HO—$R^1$—OH, which includes dihydroxy aromatic compounds of formula (3), also referred to herein as a bisphenol:

$$HO-A^1-Y^1-A^2-OH \qquad (3)$$

wherein $Y^1$, $A^1$ and $A^2$ are as described above. Also included are the more specific bisphenol compounds of general formula (4):

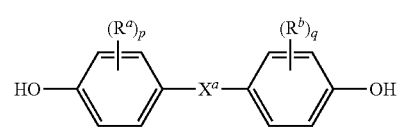 (4)

wherein $R^a$ and $R^b$ each represent a halogen atom or a monovalent hydrocarbon group and may be the same or different; p and q are each independently integers of 0 to 4. It will be understood herein that where no substituent group is specified for an atom, for example where p is 0 in formula (4), the unspecified valency or valencies will be occupied by a hydrogen atom or atoms sufficient to fill the unspecified valency or valencies, unless otherwise specified. Also, in formula (4), $X^a$ represents one of the groups of formula (5).

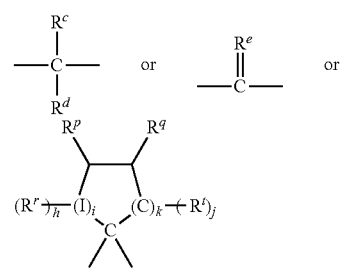 (5)

wherein $R^c$ and $R^d$ are each independently hydrogen, $C_{1-12}$ alkyl, cyclic $C_{1-12}$ alkyl, $C_{7-12}$ arylalkyl, $C_{1-12}$ heteroalkyl, or cyclic $C_{7-12}$ heteroarylalkyl, and $R^e$ is a divalent $C_{1-12}$ hydrocarbon group. Other methods are known in the art. U.S. Pat. No. 7,790,292, incorporated herein in its entirely, describes additional methods.

Polycarbonate copolymers, such as commercially available LEXAN® FST brand resins, available from SABIC Innovative Plastics, can be used as a very effective hot-melt adhesive for the above mentioned polyimide resins within a useful temperature range to avoid distortion of the parts, but still be functional over a broad temperature range. It has no measurable effect on the flame, smoke, and toxicity characteristics, does not embrittle the bond line, has no shelf life limitation, can be used as film, woven or non-woven fabric, does not affect electrical properties, can be available in a broad range of colors and can be machined readily after bonding. The polycarbonate copolymer resins may also be useful for bonding to resins other than the polyimides.

A preferred polycarbonate copolymer, such as LEXAN® FST resin is a terpolymer that surprisingly to be fully compatible with polyimides but has a $T_9$ almost 70° C. lower than polyetherimides. Due to the composition it is also very similar to polyetherimide with respect to the flame, some and toxicity properties and can be extruded into sheet, thin film, fiber and be injection molded. A film of a polycarbonate copolymer can be extruded to provide a thin uniform layer of film bond various components together. A thin uniform layer of polycarbonate copolymer film can bond a polyimide foam, to another foam. A thin uniform layer of polycarbonate copolymer film can bond a polyimide sheet to a foam another film. A thin uniform layer of polycarbonate copolymer film can bond a polyimide foam, to one or more injection molded parts or any other component in form containing substantial amounts of a polyimide resin. For example, a thin uniform layer of polycarbonate copolymer film can bond to materials, a polyimide resin based glass fiber or carbon fiber composites.

The film of a polycarbonate copolymer, can even be used to mold in reinforcement during thermoforming of polyimide based products dual matrix composites. Examples of such dual matrix composites include and are not limited to composites comprising: a network comprising a plurality of reinforcing fibers selected from metal fibers, metallized inorganic fibers, metallized synthetic fibers, glass fibers, graphite fibers, carbon fibers, ceramic fibers, mineral fibers, basalt fibers, polymer fibers having a melt temperature at least 150 C higher than the polyimide, and combinations thereof; and a matrix comprising (a) melted and cooled polyimide fibers and (b) melted and cooled polymeric binder fibers, wherein the polymeric binder has a melt temperature lower than the polyimide. Alternatively, the film can be used to mold in reinforcement during thermoforming to adhere the decorative surface film or fabric onto the molded molded dual matrix composite panels. The film of a polycarbonate copolymer can also be used to bond a polyimide sheet, and/or film or fabric continuously, for instance by using a continuous belt press or a heated roll stand, etc. When bonding foam sheets into large blocks, it can be done using a standard bagging process, since only light pressure is required to form a good bond at 200° C. Temperatures as low as 160° C. can be used depending on how high a pressure the individual parts can survive at the specific temperature. Bagging processes are known in the art and are used in the processing of processing composites whereby the part is either consolidated or shaped by having a "bag" sealed against one surface and drawing a vacuum within the sealed volume (where the part is) so that pressure (equal to atmospheric pressure) is applied to the part. Other variations can be achieved by routine experimentation. Polycarbonate polymers, such as LEXAN® FST resin is more fully described in U.S. patent applications Ser. No. 11/426,680, filed Jun. 27, 2006; Ser. No. 11/025, 635, filed Dec. 29, 2004 and U.S. Pat. No. 6,841,482, issued Mar. 1, 2005; U.S. Pat. No. 6,610,409, issued Aug. 26, 2003 and U.S. Pat. No. 6,306,507, issued Oct. 23, 2001, U.S. Pat. No. 7,790,292, the entire disclosures of which are herein incorporated by reference.

Polycarbonate polymers such as LEXAN® FST resin provide a unique combination of flame, smoke, and toxicity properties that cannot be achieved by other polymers. Polyethylene terephalate (PET), for instance will readily bond to a polyimide, but has greatly inferior flammability characteristics. In one embodiment, the substrates bonded to the adhesive layers are polyimide substrates.

Preferred polyimides include polyetherimides and polyetherimides copolymers. The polyetherimide can be selected from (i) polyetherimide homopolymers, e.g., polyetherimides, (ii) polyetherimide co-polymers, e.g., polyetherimide sulfones, and (iii) combinations thereof. Polyetherimides are known polymers and are sold by SABIC Innovative Plastics under the ULTEM®*, EXTEM®*, and Siltem* brands (Trademark of SABIC Innovative Plastics IP B.V.).

In one embodiment, the polyetherimides are of formula (1):

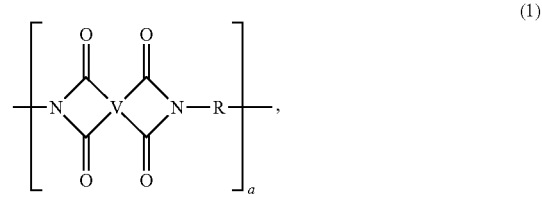

wherein a is more than 1, for example 10 to 1,000 or more, or more specifically 10 to 500.

The group V in formula (1) is a tetravalent linker containing an ether group (a "polyetherimide" as used herein) or a combination of an ether groups and arylene sulfone groups (a "polyetherimide sulfone"). Such linkers include but are not limited to: (a) substituted or unsubstituted, saturated, unsaturated or aromatic monocyclic and polycyclic groups having 5 to 50 carbon atoms, optionally substituted with ether groups, arylene sulfone groups, or a combination of ether groups and arylene sulfone groups; and (b) substituted or unsubstituted, linear or branched, saturated or unsaturated alkyl groups having 1 to 30 carbon atoms and optionally substituted with ether groups or a combination of ether groups, arylene sulfone groups, and arylene sulfone groups; or combinations comprising at least one of the foregoing. Suitable additional substitutions include, but are not limited to, ethers, amides, esters, and combinations comprising at least one of the foregoing.

The R group in formula (1) includes but is not limited to substituted or unsubstituted divalent organic groups such as: (a) aromatic hydrocarbon groups having 6 to 20 carbon atoms and halogenated derivatives thereof; (b) straight or branched chain alkylene groups having 2 to 20 carbon atoms; (c) cycloalkylene groups having 3 to 20 carbon atoms, or (d) divalent groups of formula (2):

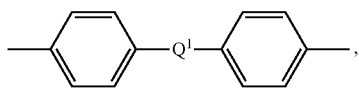
(2)

wherein $Q^1$ includes but is not limited to a divalent moiety such as —O—, —S—, —C(O)—, —SO$_2$—, —SO—, —C$_y$H$_{2y}$— (y being an integer from 1 to 5), and halogenated derivatives thereof, including perfluoroalkylene groups.

In an embodiment, linkers V include but are not limited to tetravalent aromatic groups of formula (3):

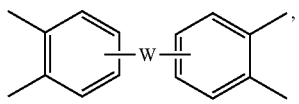
(3)

wherein W is a divalent moiety including —O—, —SO$_2$—, or a group of the formula —O—Z—O— wherein the divalent bonds of the —O— or the —O—Z—O— group are in the 3,3', 3,4', 4,3', or the 4,4' positions, and wherein Z includes, but is not limited, to divalent groups of formulas (4):

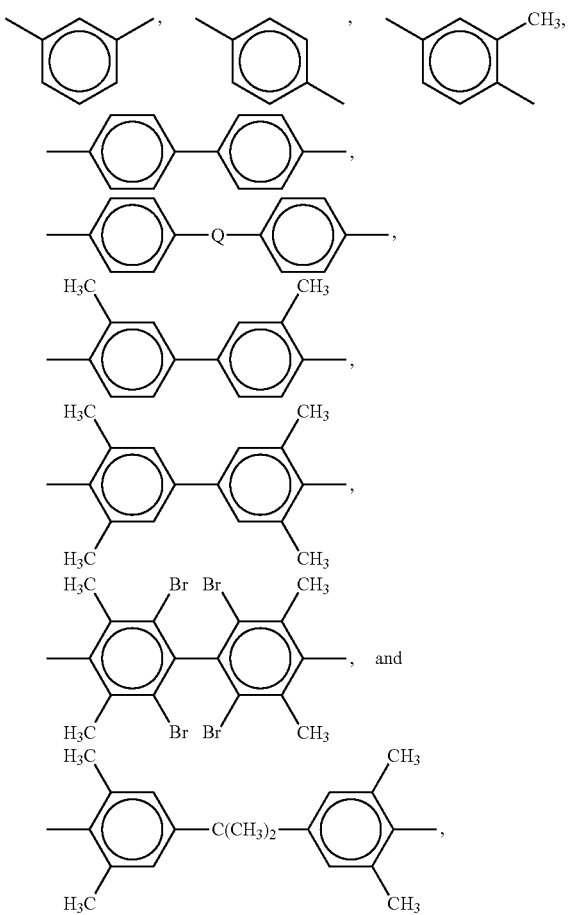
(4)

wherein Q includes, but is not limited to a divalent moiety including —O—, —S—, —C(O), —SO$_2$—, —SO—, —C$_y$H$_{2y}$— (y being an integer from 1 to 5), and halogenated derivatives thereof, including perfluoroalkylene groups.

In a specific embodiment, the polyetherimide comprise more than 1, specifically 10 to 1,000, or more specifically, 10 to 500 structural units, of formula (5):

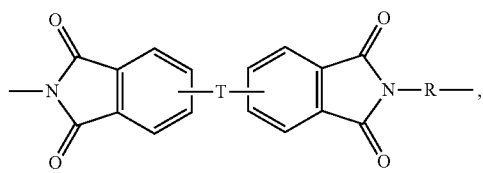
(5)

wherein T is —O— or a group of the formula —O—Z—O— wherein the divalent bonds of the —O— or the —O—Z—O— group are in the 3,3',3,4',4,3', or the 4,4' positions; Z is a divalent group of formula (3) as defined above; and R is a divalent group of formula (2) as defined above.

In another specific embodiment, the polyetherimide sulfones are polyetherimides comprising ether groups and sulfone groups wherein at least 50 mole % of the linkers V and the groups R in formula (1) comprise a divalent arylene sulfone group. For example, all linkers V, but no groups R, can contain an arylene sulfone group; or all groups R but no linkers V can contain an arylene sulfone group; or an arylene sulfone can be present in some fraction of the linkers V and R groups, provided that the total mole fraction of V and R groups containing an aryl sulfone group is greater than or equal to 50 mole %.

Even more specifically, polyetherimide sulfones can comprise more than 1, specifically 10 to 1,000, or more specifically, 10 to 500 structural units of formula (6):

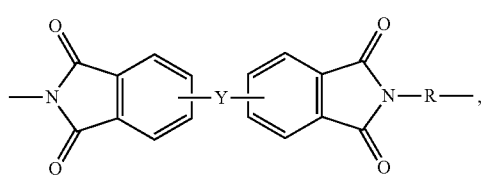
(6)

wherein Y is —O—, —SO$_2$—, or a group of the formula —O—Z—O— wherein the divalent bonds of the —O—, SO$_2$—, or the —O—Z—O— group are in the 3,3', 3,4', 4,3', or the 4,4' positions, wherein Z is a divalent group of formula (3) as defined above and R is a divalent group of formula (2) as defined above, provided that greater than 50 mole % of the sum of moles Y+moles R in formula (2) contain —SO$_2$— groups.

It is to be understood that the polyetherimides and polyetherimide sulfones can optionally comprise linkers V that do not contain ether or ether and sulfone groups, for example linkers of formula (7):

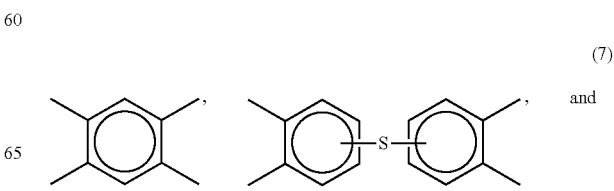
(7)

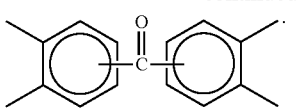

Imide units containing such linkers are generally be present in amounts ranging from 0 to 10 mole % of the total number of units, specifically 0 to 5 mole %. In one embodiment no additional linkers V are present in the polyetherimides and polyetherimide sulfones.

In another specific embodiment, the polyetherimide comprises 10 to 500 structural units of formula (5) and the polyetherimide sulfone contains 10 to 500 structural units of formula (6).

The polyetherimide and polyetherimide sulfones can be prepared by various methods, including, but not limited to, the reaction of a bis(phthalimide) for formula (8):

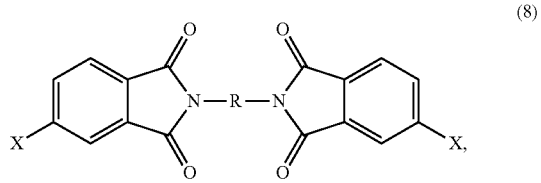

wherein R is as described above and X is a nitro group or a halogen. Bis-phthalimides (8) can be formed, for example, by the condensation of the corresponding anhydride of formula (9):

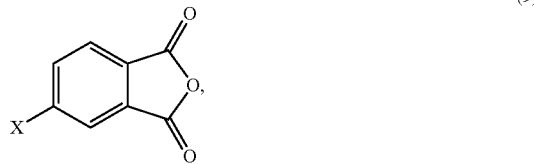

wherein X is a nitro group or halogen, with an organic diamine of the formula (10):

wherein R is as described above.

Illustrative examples of amine compounds of formula (10) include: ethylenediamine, propylenediamine, trimethylenediamine, diethylenetriamine, triethylenetetramine, hexamethylenediamine, heptamethylenediamine, octamethylenediamine, nonamethylenediamine, decamethylenediamine, 1,12-dodecanediamine, 1,18-octadecanediamine, 3-methylheptamethylenediamine, 4,4-dimethylheptamethylenediamine, 4-methylnonamethylenediamine, 5-methylnonamethylenediamine, 2,5-dimethylhexamethylenediamine, 2,5-dimethylheptamethylenediamine, 2,2-dimethylpropylenediamine, N-methyl-bis(3-aminopropyl) amine, 3-methoxyhexamethylenediamine, 1,2-bis(3-aminopropoxy)ethane, bis(3-aminopropyl)sulfide, 1,4-cyclohexanediamine, bis-(4-aminocyclohexyl)methane, m-phenylenediamine, p-phenylenediamine, 2,4-diaminotoluene, 2,6-diaminotoluene, m-xylylenediamine, p-xylylenediamine, 2-methyl-4,6-diethyl-1,3-phenylene-diamine, 5-methyl-4,6-diethyl-1,3-phenylene-diamine, benzidine, 3,3'-dimethylbenzidine, 3,3'-dimethoxybenzidine, 1,5-diaminonaphthalene, bis(4-aminophenyl)methane, bis(2-chloro-4-amino-3,5-diethylphenyl)methane, bis(4-aminophenyl)propane, 2,4-bis(b-amino-t-butyl)toluene, bis (p-b-amino4-butylphenyl)ether, bis(p-b-methyl-o-aminophenyl)benzene, bis(p-b-methyl-o-aminopentyl) benzene, 1, 3-diamino-4-isopropylbenzene, bis(4-aminophenyl)ether and 1,3-bis(3-aminopropyl)tetramethyldisiloxane. Mixtures of these amines can be used. Illustrative examples of amine compounds of formula (10) containing sulfone groups include but are not limited to, diamino diphenyl sulfone (DDS) and bis(aminophenoxy phenyl) sulfones (BAPS). Combinations comprising any of the foregoing amines can be used.

The polyetherimides can be synthesized by the reaction of the bis(phthalimide) (8) with an alkali metal salt of a dihydroxy substituted aromatic hydrocarbon of the formula HO—V—OH wherein V is as described above, in the presence or absence of phase transfer catalyst. Suitable phase transfer catalysts are disclosed in U.S. Pat. No. 5,229,482. Specifically, the dihydroxy substituted aromatic hydrocarbon a bisphenol such as bisphenol A, or a combination of an alkali metal salt of a bisphenol and an alkali metal salt of another dihydroxy substituted aromatic hydrocarbon can be used.

In one embodiment, the polyetherimide comprises structural units of formula (5) wherein each R is independently p-phenylene or m-phenylene or a mixture comprising at least one of the foregoing; and T is group of the formula —O—Z—O— wherein the divalent bonds of the —O—Z—O— group are in the 3,3' positions, and Z is 2,2-diphenylenepropane group (a bisphenol A group). Further, the polyetherimide sulfone comprises structural units of formula (6) wherein at least 50 mole % of the R groups are of formula (4) wherein Q is —SO$_2$— and the remaining R groups are independently p-phenylene or m-phenylene or a combination comprising at least one of the foregoing; and T is group of the formula —O—Z—O— wherein the divalent bonds of the —O—Z—O— group are in the 3,3' positions, and Z is a 2,2-diphenylenepropane group.

The polyetherimide and polyetherimide sulfone can be used alone or in combination with each other ans/or other of the disclosed polymeric materials in fabricating the polymeric components of the invention. In one embodiment, only the polyetherimide is used. In another embodiment, the weight ratio of polyetherimide: polyetherimide sulfone can be from 99:1 to 50:50.

The polyetherimides can have a weight average molecular weight (Mw) of 5,000 to 100,000 grams per mole (g/mole) as measured by gel permeation chromatography (GPC). In some embodiments the Mw can be 10,000 to 80,000. The molecular weights as used herein refer to the absolute weight averaged molecular weight (Mw).

The polyetherimides can have an intrinsic viscosity greater than or equal to 0.2 deciliters per gram (dl/g) as measured in m-cresol at 25° C. Within this range the intrinsic viscosity can be 0.35 to 1.0 dl/g, as measured in m-cresol at 25° C.

The polyetherimides can have a glass transition temperature of greater than 180° C., specifically of 200° C. to 500° C., as measured using differential scanning calorimetry (DSC) per ASTM test D3418. In some embodiments, the polyetherimide and, in particular, a polyetherimide has a glass transition temperature of 240 to 350° C.

The polyetherimides can have a melt index of 0.1 to 10 grams per minute (g/min), as measured by American Society for Testing Materials (ASTM) DI 238 at 340 to 370° C., using a 6.7 kilogram (kg) weight.

One process for the preparation of polyetherimides having structure (1) is referred to as the nitro-displacement process (X is nitro in formula (8)). In one example of the nitro-displacement process, N-methyl phthalimide is nitrated with 99% nitric acid to yield a mixture of N-methyl-4-nitrop-hthalimide (4-NPI) and N-methyl-3-nitrophthalimide (3-NPI). After purification, the mixture, containing approximately 95 parts of 4-NPI and 5 parts of 3-NPI, is reacted in toluene with the disodium salt of bisphenol-A (BPA) in the presence of a phase transfer catalyst. This reaction yields BPA-bisimide and $NaNO_2$ in what is known as the nitro-displacement step. After purification, the BPA-bisimide is reacted with phthalic anhydride in an imide exchange reaction to afford BPA-dianhydride (BPADA), which in turn is reacted with meta-phenylene diamine (MPD) in ortho-dichlorobenzene in an imidization-polymerization step to afford the product polyetherimide.

An alternative chemical route to polyetherimides having structure (1) is a process referred to as the chloro-displacement process (X is Cl in formula (8)). The chloro-displacement process is illustrated as follows: 4-chloro phthalic anhydride and meta-phenylene diamine are reacted in the presence of a catalytic amount of sodium phenyl phosphinate catalyst to produce the bischloro phthalimide of meta-phenylene diamine (CAS No. 148935-94-8). The bischloro phthalimide is then subjected to polymerization by chloro-displacement reaction with the disodium salt of BPA in the presence of a catalyst in ortho-dichlorobenzene or anisole solvent. Alternatively, mixtures of 3-chloro- and 4-chlorophthalic anhydride may be employed to provide a mixture of isomeric bischloro phthalimides which may be polymerized by chloro-displacement with BPA disodium salt as described above.

Siloxane polyetherimides can include polysiloxane/polyetherimide block copolymers having a siloxane content of greater than 0 and less than 40 weight percent (wt %) based on the total weight of the block copolymer. The block copolymer comprises a siloxane block of Formula (I):

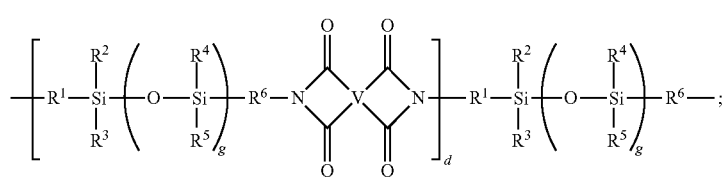

(I)

wherein $R^{1-6}$ are independently at each occurrence selected from the group consisting of substituted or unsubstituted, saturated, unsaturated, or aromatic monocyclic groups having 5 to 30 carbon atoms, substituted or unsubstituted, saturated, unsaturated, or aromatic polycyclic groups having 5 to 30 carbon atoms, substituted or unsubstituted alkyl groups having 1 to 30 carbon atoms and substituted or unsubstituted alkenyl groups having 2 to 30 carbon atoms, V is a tetravalent linker selected from the group consisting of substituted or unsubstituted, saturated, unsaturated, or aromatic monocyclic and polycyclic groups having 5 to 50 carbon atoms, substituted or unsubstituted alkyl groups having 1 to 30 carbon atoms, substituted or unsubstituted alkenyl groups having 2 to 30 carbon atoms and combinations comprising at least one of the foregoing linkers, g equals 1 to 30, and d is 2 to 20. Commercially available siloxane polyetherimides can be obtained from SABIC Innovative Plastics under the brand name SILTEM* (*Trademark of SABIC Innovative Plastics IP B.V.)

The polyetherimide resin can have a weight average molecular weight (Mw) within a range having a lower limit and/or an upper limit. The range can include or exclude the lower limit and/or the upper limit. The lower limit and/or upper limit can be selected from 5000, 6000, 7000, 8000, 9000, 10000, 11000, 12000, 13000, 14000, 15000, 16000, 17000, 18000, 19000, 20000, 21000, 22000, 23000, 24000, 25000, 26000, 27000, 28000, 29000, 30000, 31000, 32000, 33000, 34000, 35000, 36000, 37000, 38000, 39000, 40000, 41000, 42000, 43000, 44000, 45000, 46000, 47000, 48000, 49000, 50000, 51000, 52000, 53000, 54000, 55000, 56000, 57000, 58000, 59000, 60000, 61000, 62000, 63000, 64000, 65000, 66000, 67000, 68000, 69000, 70000, 71000, 72000, 73000, 74000, 75000, 76000, 77000, 78000, 79000, 80000, 81000, 82000, 83000, 84000, 85000, 86000, 87000, 88000, 89000, 90000, 91000, 92000, 93000, 94000, 95000, 96000, 97000, 98000, 99000, 100000, 101000, 102000, 103000, 104000, 105000, 106000, 107000, 108000, 109000, and 110000 daltons. For example, the polyetherimide resin can have a weight average molecular weight (Mw) from 5,000 to 100,000 daltons, from 5,000 to 80,000 daltons, or from 5,000 to 70,000 daltons. The primary alkyl amine modified polyetherimide will have lower molecular weight and higher melt flow than the starting, unmodified, polyetherimide.

The polyetherimide resin can be selected from the group consisting of a polyetherimide, for example as described in U.S. Pat. Nos. 3,875,116; 6,919,422 and 6,355,723 a silicone polyetherimide, for example as described in U.S. Pat. Nos. 4,690,997; 4,808,686 a polyetherimide sulfone resin, as described in U.S. Pat. No. 7,041,773 and combinations thereof, each of these patents are incorporated herein their entirety.

The polyetherimide resin can have a glass transition temperature within a range having a lower limit and/or an upper limit. The range can include or exclude the lower limit and/or the upper limit. The lower limit and/or upper limit can be selected from 100, 110, 120, 130, 140, 150, 160, 170, 180, 190, 200, 210, 220, 230, 240, 250, 260, 270, 280, 290, 300 and 310 degrees Celsius. For example, the polyetherimide resin can have a glass transition temperature (Tg) greater than about 200 degrees Celsius.

The polyetherimide resin can be substantially free (less than 100 ppm) of benzylic protons. The polyetherimide resin can be free of benzylic protons. The polyetherimide resin can have an amount of benzylic protons below 100 ppm. In one embodiment, the amount of benzylic protons ranges from more than 0 to below 100 ppm. In another embodiment, the amount of benzylic protons is not detectable.

The polyetherimide resin can be substantially free (less than 100 ppm) of halogen atoms. The polyetherimide resin can be free of halogen atoms. The polyetherimide resin can have an amount of halogen atoms below 100 ppm. In one embodiment, the amount of halogen atoms range from more than 0 to below 100 ppm. In another embodiment, the amount of halogen atoms is not detectable.

The process for bonding a polyimide foam, into multiple layered blocks using a suitable polycarbonate copolymer film is simple and direct.

Referring to FIG. 1, sheets of, polyimide foam, 10, 20 can be interleafed with a 2 mil, or preferably 3 mil, extruded polycarbonate copolymer film 15 having useful flame, smoke and toxicity properties, and heated under light pressure (10 to 15 psi) to 385° F. After holding under those conditions for 10 to 15 minutes the article is allowed to cool. The hold time may be eliminated when interleafing more than 3 layers, because heat transfer can be rather poor between the multiple layers, since polyimide foams, are typically good insulators. Therefore, many-layered embodiments will inherently require some time to cool down to 100° F. to 125° F., providing ample hold time. It is advisable to insert a thermocouple the first time a construction is laminated to determine the proper length of time needed to reach 385° F. in the core layer. Subsequent run schedules can be based on the time required to reach the proper core temperature during the initial run. The samples were tested only to see if the bond failure was adhesive or cohesive and in all cases was found to be cohesive in the foam next to the bond.

The following Table lists some of the physical properties of the ULTEM® 1000, ULTEM® 5000 and EXTEM® and EXTEM® 1000 brand polyimide materials.

| Material | Description | Glass Transition Temperature (Tg) |
|---|---|---|
| ULTEM ® 5000 (polyimide) | Polyetherimide made by reaction of BPADA and paraphenylene diamine (PPD) | 224° C. |
| EXTEM ® (polyimide) | Polyetherimide copolymer made by the reaction of (i) ODPA, (ii) BPADA, and (iii) diaminodiphenyl sulfone | 247-310° C. |
| ULTEM ® 1000 (polyimide) | Polyetherimide made by reaction of BPADA and metaphenylene diamine (MPD) | 217° C. |
| LEXAN ® FST (polycarbonate copolymer) | Polycarbonate copolymer comprising reacted resorcinol, siloxane, and bisphenol-A | 145° C. |

Thin layers of polyetherimide films were also bonded to foam board from 2 to 25 mm thick with excellent results. In other experiments foam was bonded to sheets of aircraft grade opaque polycarbonate copolymer resin with equally good results. A polyimide film, specifically an ULTEM® 1000 film, was also bonded to ULTEM® 5001 film using 50 µm FST film with excellent results. To form a good bond to EXTEM® resin required higher pressures and 410° F. KAPTON® brand film did not appear to adhere at the settings used for ULTEM®, and was not tested under more extreme conditions.

A first embodiment relates to an article comprising a plurality of substrates, and an adhesive bonded between at least two of the plurality of substrates, wherein the adhesive comprises a polycarbonate copolymer comprising reacted resorcinol, siloxane, and bisphenol-A. One or more of the plurality of substrates can be a polymer substrate. One or more of the plurality of substrates can be a polyimide substrate. One or more of the plurality of substrates can be selected from the group of polyimide foams, polyimide composites, polyimide fabrics, polyimide films, injection-molded polyimide articles, compression molded polyimide articles, Polyimide composite sheets and combinations thereof. One or more of the plurality of substrates can be a polymeric foam. One or more of the plurality of substrates can be a film having a thickness ranging from more than 0 and less than 0.75 cm. One or more of the plurality of substrates can be an injection molded article. One or more of the plurality of substrates can be a compression-molded article. One or more of the plurality of substrates can be a fabric. In one embodiment, the invention encompasses an article comprising a plurality of substrates, and an adhesive bonded between at least two of the plurality of substrates, wherein the adhesive comprises a polycarbonate copolymer comprising reacted resorcinol, siloxane, and bisphenol-A,. wherein at least one of the plurality of substrates is a polyimide substrate, with the proviso that the polyimide substrate does not include a poly(4,4'-oxydiphenylene-pyromellitimide). In another embodiment, the substrate is not a polyketone, e.g., a polyetherketone.

The article can be selected from the group of radomes, fuselages, wings, structured products, structured cores, stow bins, galley panels, lavatory walls, dividers,structured panels, and other articles with related performance requirements. The article can have a 2-minute integrated heat release rate of less than or equal to 65 kilowatt–minutes per square meter (kW–min/m2) and a peak heat release rate of less than 65 kilowatts per square meter (kW/m2) as measured using the method of FAR F25.4, in accordance with Federal Aviation Regulation FAR 25.853(d).

A second embodiment relates to an article comprising a first polyimide substrate; a second polyimide substrate; and an adhesive bonded between the first substrate and the second substrate, wherein the article has a 2-minute integrated heat release rate of less than or equal to 65 kilowatt–minutes per square meter (kW–min/m2) and a peak heat release rate of less than 65 kilowatts per square meter (kW/m2) as measured using the method of FAR F25.4, in accordance with Federal Aviation Regulation FAR 25.853 (d). The first polyimide substrate can be selected from the group of polyimide foams, polyimide composites, polyimide fabrics, polyimide films, injection-molded polyimide articles, compression molded polyimide articles, and combinations thereof. The second polyimide substrate can be selected from the group of polyimide foams, polyimide composites, polyimide fabrics, polyimide films, injection-molded polyimide articles, compression molded polyimide articles, and combinations thereof. The adhesive can comprise a polycarbonate copolymer comprising reacted resorcinol, siloxane, and bisphenol-A.

A third embodiment relates to an adhesive comprising a polycarbonate copolymer comprising reacted resorcinol, siloxane, bisphenol-A.

A fourth embodiment relates to a method comprising bonding a first substrate to a second substrate with an adhesive comprising a polycarbonate copolymer comprising reacted resorcinol, siloxane, and bisphenol-A. The adhesive can be an extruded film having a thickness in a range of from at least 0.5 mil to 3 mil. The adhesive film can be thinner or thicker than 2-3 mil depending on the surface smoothness and fit of the mating surfaces. The smoother and closer fitting the surfaces are the thinner the film can be and still give an effective bond. The practical limits are due to the conversion process, which could be blown, cast or extruded film ranging upward from perhaps 0.5 mil. The first substrate and the second substrate can be bonded at a temperature in a range of from 160 to 350° C.

A fifth embodiment relates to a method comprising bonding of polymers and materials other than polyimides to each other. In such an embodiment, the adhesive can be used to bond non-polyimide containing substrates or other materials together. In one embodiment, the adhesive is in a form selected from the group of foams, cloths tapes, powders, fibers, papers, and combinations thereof.

A first substrate and a second substrate can be bonded at a pressure in a range of from 0.1 to 40 bar. The method can further comprise introducing reinforcing fibers to the adhesive. The fibers can comprise polycarbonate copolymer comprising reacted resorcinol, siloxane, and bisphenol-A. Reinforcing fibers can be included with the adhesive film to strengthen or stiffen the construction. Other components, such as sensors and/or conductors can also be included with the adhesive film. In another embodiment, the first substrate and the second substrate are bonded at a pressure in a range of from 0.1 to 15 bar.

Advantageously, our invention now provides useful articles that can be used in numerous applications. For instance; our articles can be used in aircraft applications. Examples of such aircraft applications include and are not limited to composite seat back structures for aircraft passenger seats, aircraft passenger seats, and one-piece composite structural frames that may or may not be in concert with an airframe structure of an aircraft to form structures such as seat sub-frames. Other uses of articles include comfort frame assemblies, body panels, and the like.

Although the present invention has been described in detail with reference to certain preferred versions thereof, other variations are possible. Therefore, the spirit and scope of the appended claims should not be limited to the description of the versions contained therein.

EXAMPLES

Examples 1-9

Different article components were made using polycarbonate polysiloxane copolymers according to various embodiments.
Materials
Table 1 lists materials employed in the examples.

Techniques & Procedures

Articles were made that illustrate the process for binding two polyimide substrates of various kinds with a polysiloxane polycarbonate, in accordance with various embodiments.

1. Techniques/Procedure for Making Article Components with Polyetherimide Film and a Polyetherimide Injection Molded Plaque The following components were assembled and bonded together into a block using the TMP vacuum press. A piece (10, 20) of extruded Polyimide A film and an equal size injection molded plaque of Polyimide A film and a piece (15) of 50 μm polycarbonate copolymer extruded film as an adhesive layer were stacked in the order as shown in FIG. 1. A press plate was placed on top and bottom of the assembly that was then put into the TMP press, which had been preheated to 40° C. The chamber was closed and the press heated to 150° C. Once the set temperature had been reached vacuum was applied and the press was set to heat to 195° C., at which time 5 bar pressure were applied and the press was set to cool to 40° C. After a total press time of 28 minutes the sample was removed from the press and was allowed to cool to room temperature. All of the bond lines appeared to be sound and the sample was allowed to equilibrate at room temperatures for 24 hours prior to testing. A standard DeFelsco Positest procedures with 3M Scotch-Weld epoxy as the "dolly" adhesive.

2. Techniques/Procedure for Making Article Components with Polyetherimide (ULTEM®) Film and an Polyetherimide (ULTEM® XH 6050) Resin Injection Molded Plaque The following components were assembled and bonded together into a block using the TMP vacuum press. A piece (10, 20) of extruded polyetherimide (ULTEM®) film, an polyetherimide (ULTEM® XH 6050) injection molded plaque of equal size sheet of polyetherimide (ULTEM® 1000) film and a piece of 50 μm polycarbonate copolymer extruded film as an adhesive layer were stacked in the order as shown in FIG. 1. A press plate was placed on top and bottom of the assembly that was then put into the TMP press, which had been preheated to 40° C. The chamber was closed and the press heated to 150° C. Once the press reached the set temperature it was reset to 225° C., 5 bar pressure was applied and the press was set to cool to 40° C. After a total press time of 32 minutes, the sample was removed from the

TABLE 1

| Material | Name/Description | Source |
| --- | --- | --- |
| PolyimideA | ULTEM ® 1000 resin | SABIC Innovative Plastics |
| Polyimide B | ULTEM ® XH 6050 resin | SABIC Innovative Plastics |
| Polyimide C | EXTEM ® HU 1004 resin | SABIC Innovative Plastics |
| Polyimide D | KAPTON ® poly(4,4'-oxydiphenylene-pyromellitimide). | DuPont |
| Polyetherketone A | PEEK (amorphous) resin | Victrex |
| Polyetherketone B | PEEK (crystalline) resin | Victrex |
| Polycarbonate Copolymer | LEXAN ® FST resin | SABIC Innovative Plastics |
| Polyetherimide foam | ULTEM ® FoamXP 060 | Sabic Innovative Plastics |
| Polycarbonate Copolymer Board | Board made from LEXAN FST resin and glass | SABIC Innovative Plastics |
| ULTEM ®/glass fabric | Cetex 2X Brand Fabric | TenCate |
| Injection Molded Carbon Fiber Reinforced polyetherimide plaques bonded to a polyetherimide film | Bonded with LEXAN ® FST to ULTEM ® film (See: Example 12) | Sabic Innovative Plastics |
| Polyimide A Film | Polyetherimide Film | Sabic Innovative Plastics | press and was allowed to cool to room temperature. All of the bond lines appeared to be sound and the sample was allowed to equilibrate at room temperatures for 24 hrs. prior to testing. The standard DeFelsco Positest procedures with 3M Scotch-Weld epoxy adhesive to bond the test sample to the aluminum was used.

3. Techniques/Procedure for Making Article Components with Polyetherimide (ULTEM®) Film and a Glass Reinforced Board U1350)

The following components were assembled and bonded together into a sheet using the TMP vacuum press. A piece of extruded Polyimide A film and an equal size piece of a dual matrix composite a dual matrix composite comprising: a network comprising a plurality of reinforcing fibers selected from metal fibers, metallized inorganic fibers, metallized synthetic fibers, glass fibers, graphite fibers, carbon fibers, ceramic fibers, mineral fibers, basalt fibers, polymer fibers having a melt temperature at least 150 C higher than the polyimide, and combinations thereof; and a matrix comprising (a) melted and cooled polyimide fibers and (b) melted and cooled polymeric binder fibers, wherein the polymeric binder has a melt temperature lower than the polyimide, were stacked and a piece of Polycarbonate Copolymer film was interposed as the adhesive layer. A press plate was placed on top and bottom of the assembly that was then put into the TMP press, which had been preheated to 40° C. The chamber was closed and the press heated to 150° C. Once the set temperature had been reached vacuum was applied and the press was set to heat to 195° C. at which time 5 bar pressure were applied and the press was set to cool to 40° C. After a total press time of 28 minutes the sample was removed from the press and was allowed to cool to room temperature. All of the bond lines appeared to be sound and the sample was allowed to equilibrate at room temperatures for 24 hours prior to testing. A standard DeFelsco Positest procedures with 3M Scotch-Weld epoxy as the "dolly" adhesive.

4. Techniques/Procedure for Making Article Components with Polyetherimide (ULTEM®) Film and Polyetherimide (ULTEM®) Foam Board A piece (10, 20) of extruded polyetherimide (ULTEM®) foam board (XP060 1"×14"×16") an equal size sheet of Polyimide A film and a piece (15) of 50 µm polycarbonate copolymer extruded film as an adhesive layer, were stacked in the order as shown in FIG. 1. A press plate was placed on top and bottom of the assembly, which was then put into the TMP press, which had been preheated to 40° C. The chamber was closed and the press heated to 150° C. and vacuum was applied. Once the set temperature had been reached the set temperature, it was reset to 195° C., 3 bar pressure was applied and the press was set to cool to 40° C. After a total press time of 28 minutes the sample was removed from the press and was allowed to cool to room temperature. All of the bond lines appeared to be sound and the sample was tested using standard DeFelsco Positest procedures with 3M Scotch-Weld epoxy adhesive to bond the test sample to the aluminum. The samples were allowed to equilibrate at room temperatures for 24 hours prior to testing.

5. Techniques/Procedure for Making Article Components with Two Polyimide Polymers, Polyetherimide (ULTEM®) Film and Polyimide D (KAPTON®) Polyimide Film Films of polyetherimide (ULTEM®) and of Polyimide D were interleafed with polycarbonate copolymer film, placed between in a TMP vacuum press with the stack between steel plates. The TMP press had been preheated to 40° C. The chamber was closed and set to 150° C. Once the temperature was reached it was reset to 225° C. and vacuum was applied. When the platens reached 225° C., 5 bar pressure was applied and the press was set to cool. After a total press time of 32 minutes, the sample was removed from the press and allowed to cool to room temperature. No testing was required, since there did not appear to be any measurable adhesion between the FST and the Polyimide D films.

6. Techniques/Procedure for Making Article Components with Two Polyetherimide Injection Molded Plaques The following components were assembled and bonded together into a sheet using the TMP vacuum press. Two pieces of injection molded polyetherimide (ULTEM®) and an equal size piece of Polycarbonate Copolymer film interspersed between them. A press plate was placed on top and bottom of the assembly that was then put into the TMP press, which had been preheated to 40° C. The chamber was closed and the press heated to 150° C. Once the set temperature had been reached vacuum was applied and the press was set to heat to 195° C. at which time 5 bar pressure were applied and the press was set to cool to 40° C. After a total press time of 28 minutes the sample was removed from the press and was allowed to cool to room temperature. All of the bond lines appeared to be sound and the sample was allowed to equilibrate at room temperatures for 24 hours prior to testing. A standard DeFelsco Positest procedures with 3M Scotch-Weld epoxy as the "dolly" adhesive was used to evaluate adhesion.

7. Techniques/Procedure for Making Article Components with an Amorphous and a Semicrystalline Film of PEEK on Either Side of an Extruded Polyimide A Film The following components were assembled and bonded together into a sheet using the TMP vacuum press. A piece of amorphous PEEK film, an extruded Polyimide A film and a film of semi-crystalline PEEK with extruded Polycarbonate Copolymer films were interposed between the layers as the adhesive layer. A press plate was placed on top and bottom of the assembly that was then put into the TMP press, which had been preheated to 40° C. The chamber was closed and the press heated to 150° C. Once the set temperature had been reached vacuum was applied and the press was set to heat to 225° C., at that point 5 bar pressure was applied and the press was set to cool to 40° C. After a total press time of 32 minutes the sample was removed from the press and was allowed to cool to room temperature. No testing was necessary, since there appeared to be no measurable bonding between either PEEK layer or the adjacent polycarbonate copolymer layer.

8. Techniques/Procedure for Making Article Components of Polyetherimide (ULTEM®) Film and Cetex The following components were assembled and bonded together into a sheet using the TMP vacuum press. A piece of extruded Polyimide A film, an equal size piece of Cetex 2X, polyetherimide (ULTEM®) resin entrained glass fabric sheet and an equal size piece of polycarbonate copolymer film placed between them and a press plate placed on top and bottom of the assembly was put into a TMP press, which had been preheated to 40° C. The chamber was closed and the press heated to 150° C. Once the set temperature had been reached vacuum was applied and the press was set to heat to 195° C. at which time 5 bar pressure were applied and the press was set to cool to 40° C. After a total press time of 28 minutes the sample was removed from the press and was allowed to cool to room temperature. All of the bond lines appeared to be sound and the sample was allowed to equilibrate at room temperatures for 24 hours prior to testing. A standard DeFelsco Positest procedures with 3M Scotch-Weld epoxy as the "dolly" adhesive was used to evaluate adhesion.

9. Techniques/Procedure for Making Article Components with Two Polyimide Resin Including POLYIMIDE A Film and an Polyetherimide Copolymer (EXTEM® HU 1004) Resin Plaque The following components were assembled and bonded together into a sheet using the PPDC TMP vacuum press. A plaque of injection molded polyetherimide copolymer (EXTEM® HU 1004) and an equal size piece of extruded Polyimide A film were bonded together using polycarbonate copolymer (LEXAN® FST) film as the melt adhesive. A press plate was placed on top and bottom of the assembly and was placed into the TMP press, which had been preheated to 40° C. The chamber was closed and the press heated to 150° C. Once the set temperature had been reached vacuum was applied and the press was set to heat to 225° C. at which time 5 bar pressure were applied and the press was set to cool to 40° C. After a total press time of 32 minutes the sample was removed from the press and was allowed to cool to room temperature. All of the bond lines appeared to be sound and the sample was allowed to equilibrate at room temperatures for 24 hours prior to testing. A standard DeFelsco Positest procedures with 3M Scotch-Weld epoxy as the "dolly" adhesive was used to evaluate adhesion.

10. Techniques/Procedure for Making Article Components of Extruded POLYIMIDE A Film and an Injection Molded, Carbon Fiber Reinforced Polyetherimide (ULTEM®) Plaque An extruded polyetherimide (ULTEM®) film and an injection molded plaque of carbon fiber reinforced polyetherimide (ULTEM®) resin were bonded together into a sheet using polycarbonate copolymer (LEXAN® FST) as the adhesive. A plaque of the injection molded reinforced polyetherimide (ULTEM®) was layered with a film of Polycarbonate Copolymer and an polyetherimide (ULTEM®) 100 film and placed between press plates top and bottom of the assembly. The assembly was placed into the TMP press, which had been preheated to 40° C. The chamber was closed and the press heated to 150° C. Once the set temperature had been reached vacuum was applied and the press was set to heat to 195° C. at which time 5 bar pressure were applied and the press was set to cool to 40° C. After a total press time of 32 minutes the sample was removed from the press and was allowed to cool to room temperature. All of the bond lines appeared to be sound and the sample was allowed to equilibrate at room temperatures for 24 hours prior to testing. A standard DeFelsco Positest procedures with 3M Scotch-Weld epoxy as the "dolly" adhesive was used to evaluate adhesion.

11. Techniques/Procedure for Making Polyimide Fiber/Carbon Fiber Composites

Four sets of nominally 6 mm×30 mm×170 mm polyetherimide (ULTEM®) fiber/carbon fiber composites were prepared by stacking two 3 mm strips of the composite with a 50 µm Polycarbonate Copolymer film nominally 30 mm×170 mm interposed between the composite strips. The stacks were arranged around the perimeter of an induction heated tool set for maximum temperature. Due to design limitations the tool was only able to reach approximately 200 degrees Celsius. At that temperature and a pressure of 4 bar the polyetherimide (ULTEM®) composite did not melt or distort, but the Polycarbonate Copolymer melted causing an excellent bond to form between the adjacent composite surfaces.

12. Techniques/Procedure for Making Article Components with a Polyimide Foam and a Polyimide Composite An approximately 2 mm×150 mm×150 mm piece of extruded polyetherimide foam (ULTEM® foam) was placed between two pieces of 50 µm Polycarbonate Copolymer film as an adhesive layer slightly larger in size than the foam. The stack was then placed between two sheets of 75 µm polyetherimide (ULTEM®) film slightly larger than the Polycarbonate Copolymer film. The assembly was placed between two pieces of heavy gauge aluminum foil treated with a release agent (MAC 1031) which was placed in a small press set at 195 degrees Celsius and approximately 3 bar were applied for 6 minutes. The foil and composite stack were then transferred to a second press set to 120 degrees Celsius for cooling. After approximately three minutes the assembly was removed from the cooling press. The aluminum was removed easily from the stack. The film/foam/film construction was fully bonded without any apparent damage to the foam and a smooth surface.

13. Techniques/Procedure for Making Article Components with a Fabric and a Polyimide Composite A piece of polyetherimide (ULTEM®) resin and carbon fiber composite was covered with a 50 µm Polycarbonate Copolymer film. A piece of nylon fabric was placed on top of the film. The assembly was placed between two titanium sheets, which had been treated with release agent and placed into a press set to 180 degrees Celsius and 5 bar pressure for 6 min. Upon cooling in a second press set to 100 degrees Celsius for 3 minutes the assembly was removed and allow to cool to near room temperature. The fabric appeared unaffected by the process and was securely attached to the composite.

14. Techniques/Procedure for Making Article Component with Two Films and a Polyimide Film A 125 µm sample of extruded polyetherimide (ULTEM® 1000-1000) film was covered on both sides with Polycarbonate Copolymer film. A layer of extruded 25 µm polyetherimide (ULTEM® 5001) film was then added to both sides. The stack of films was placed between two sheets of high strength aluminum foil that had been treated with release agent (MAC 1031) on the contact surfaces. The whole assembly was placed into a press set to 195 degrees Celsius for 6 minutes at 4 bar pressure, after which time it was placed into a cooling press at room temperature for ~2 min. Upon removal from between the aluminum foil both films of polyetherimide (ULTEM® 5001) were securely bonded to the polyetherimide (ULTEM® 1000) film. A small area where the Polycarbonate Copolymer film had slipped on the top side and thus had no Polycarbonate Copolymer film between it and the polyetherimide (ULTEM® 1000) film and the polyetherimide (ULTEM® 5001) film was not bonded.

15. Techniques/Procedure for Making Article Component with Two Films and a Polyimide Foam An approximately 2 mm×150 mm×150 mm piece of extruded polyetherimide (ULTEM®) foam was placed between two pieces of 50 µm Polycarbonate Copolymer film slightly larger in size than the foam. The stack was then placed between two sheets of 75 µm polyetherimide (ULTEM®) film slightly larger than the Polycarbonate Copolymer film. The assembly was placed between two pieces of heavy gauge aluminum foil treated with a release agent (MAC 1031) which was placed in a small press set at 195 degrees Celsius and approximately 3 bar were applied for 6 minutes. The foil and composite stack were then transferred to a second press set to 120 degrees Celsius for cooling. After approximately three minutes the assembly was removed from the cooling press. The aluminum was removed easily from the stack. The film/foam/film construction was fully bonded without any apparent damage to the foam and a smooth surface.

16. Techniques/Procedure for Making Article Components with Injection Molded Articles An electrical connector molded of polyetherimide (ULTEM®) glass filled resin was bonded to tray of injection molded polyetherimide (ULTEM®) with the flat rim of the connector making contact with the tray. A piece of 75 µm Polycarbonate Copolymer film was trimmed to just slightly larger than the contact area and placed between the tray and the connector. The assembly was placed into a press set to 200 degrees Celsius. The press was closed to exert a light pressure on the area of the film and the assembly was allowed to heat to a uniform temperature. The assembly was then moved to a cooling press and allowed to cool to near room temperature prior to removing from the cooling press. The connector was securely bonded to the tray without any distortion of either part.

17. Techniques/Procedure for Making Article Components with Extruded Articles

A piece of extruded polyetherimide (ULTEM® 1000) sheet was placed on a piece of extruded polyetherimide copolymer (EXTEM® XH 1005) sheet. A piece of 50 µm Polycarbonate Copolymer film was placed between them so that only half of the polyetherimide (ULTEM®) sheet and the polyetherimide copolymer (EXTEM®) sheet were exposed to the Polycarbonate Copolymer film. The assembly was placed between titanium plates that had been treated with MAC 1031 to insure easy release of any of the components. The assembly was then placed into a press set to 210 degrees Celsius. A pressure of 5 bars was applied and the assembly was allowed to heat up to the set temperature over a period of 8 minutes, after which time the assembly was placed into a cooling press under similar pressure and set to 100 degrees Celsius for ~3 minutes. After removal from the press the assembly was allowed to cool to room temperature. The polyetherimide (ULTEM®) and the polyetherimide copolymer (EXTEM®) extruded sheets were securely bonded, but only where the Polycarbonate Copolymer was disposed between them.

18. Techniques/Procedure for Making Article Components with Compression Molded Articles A hollow container was formed from two compression molded bowls. Bowls were compression molded from consolidated sheet of multiple layers of polyetherimide (ULTEM®) fiber and carbon fiber fabric. Sufficient layers of fabric to form a 3 mm thick plate on consolidation were placed between sheets of polished aluminum that had been treated with high temperature release agent (MAC 1031) and then were placed into a press set to 175 degrees Celsius and the temperature was slowly raised to 360 degrees Celsius. Pressure was slowly applied once the temperature had reached 210 degrees Celsius, until the pressure reached 35 bar. The pressure and temperature were held at those conditions for 15 min. at that point the cooling was begun under pressure until the press platens reached 260 degrees Celsius. The pressure was then slowly reduced while the press was further cooled to 50 degrees Celsius. The press was opened and the plate removed from the cooling press.

The composite plate was wrapped in high temperature release film, reheated to 360 degrees Celsius, placed on the bottom half of a compression tool and the press closed, forcing the male part of the tool to form the softened composite sheet into the shape of a bowl. Both halves of the compression tool were heated to about 190 degrees Celsius to permit controlled cooling of the composite while still permitting deformation to occur.

Once two bowls had been compression molded and the rim cleaned and sanded flat Polycarbonate Copolymer film was placed between the edges of the bowls. The thus formed hollow container was strapped with steel bands and over springs on the bottom of the bowls. The assembly was placed in a forced hot air oven set to 195 degrees Celsius and held at that temperature for 10 min. After cooling the banding was removed. The bowls had been securely joined together by the Polycarbonate Copolymer film melt adhesive.

19. Heat Testing Procedure

Heat release testing was done on 15.2×15.2 cm plaques 2.0 mm thick using the Ohio State University (OSU) rate-of-heat release apparatus, as measured by the method listed in FAR 25.853. Heat release was measured at two-minutes in $kW-min/m^2$ (kilowatt minutes per square meter). The peak heat release was measured as kW/m2 (Kilowatt per square meter). The time to maximum heat release, in minutes, was also measured. The heat release test method is also described in the "Aircraft Materials Fire Test Handbook" DOT/FAA/AR-00/12, Chapter 5 "Heat Release Test for Cabin Materials".

20. Peel Strength Testing

The articles made by the foregoing Examples were subjected to standard peel testing procedures. The peel testing procedure ISO 8510-1;1990 was used. ISO 8510-1;1990 is a 90 degree peel test of a flexible bonded to a rigid test specimen substrate. The flexible film is fixtured in a tensile test machine grip and pulled and the resulting peel force is measured. Peel strength is typically reported in pounds/linear inch.

The following table provides a summary of the temperature conditions at which the following Examples were conducted. Reference is made to either "Low Temperature" Conditions or "High Temperature" Conditions.

| "Low Temperature" Conditions | | | |
|---|---|---|---|
| Temp. °C. | Action | Pressure tor | Elapsed t min./sec. |
| 40 | Begin heating | 3-7 | 0.0/0.0 |
| 150 | Pull vacuum | 3-7 | 10.0/10.0 |
| 195 | Apply pressure, begin cooling | 3-7 | 16/45 |
| 40 | Remove sample | 3-7 | 28/0 |

| "High Temperature" Conditions | | | |
|---|---|---|---|
| Temp. °C. | Action | Pressure tor | Elapsed t min./sec. |
| 40 | Begin Heating | 3-7 | 0.0/0.0 |
| 150 | Pull vacuum | 3-7 | 10.0/35.0 |
| 225 | Apply pressure, begin cooling | 3-7 | 19.0/10.0 |
| 40 | Remove sample | 3-7 | 32/0 |

EXAMPLES

For the following examples, articles were made (or attempted to be made) by using including a plurality of substrates and an adhesive (that included a polycarbonate copolymer comprising reacted resorcinol, siloxane, and bisphenol-A) in accordance to the techniques and procedure described above. In all cases, the strength required to make layers of the articles separate was determined. There were two types of failures that could occur: (i) adhesive failure (where substrates of the articles separate from the adhesive and the separated substrate remain intact (ii) cohesive (substrate) failure (where one or more of the substrates fractures. As indicated above, a standard DeFelsco Positest procedures with 3M Scotch-Weld epoxy as the "dolly" adhesive was used to evaluate adhesion. The Examples are numbered in accordance to the number of the technique mentioned above. In some cases, examples were not available for an indicated technique.

Examples 1(a)-(e)

Article Construction (Polyetherimide Film, Polycarbonate

The articles of Examples 1(a)-1(e) were made in accordance to the technique and procedures described above in section "1" of the Techniques & Procedure, i.e. at "Low Temperature" conditions. The strength required to make layers of the articles separate was determined as indicated above. We observed whether the failures that occurred was (i) an adhesive failure (where substrates of the articles separated from the adhesive and the separated substrate remained intact or (ii) cohesive (substrate) failure (where at least one substrate fractured or did not remain intact).

| Sample | Sample Construction | Thickness (mm) |
| --- | --- | --- |
| 1 | polyetherimide (ULTEM ® 1000) Film | 0.13 |
|   | polycarbonate copolymer (LEXAN ® FST) Film | 0.08 |
|   | polyetherimide (ULTEM ® 1000) IM Plaque | 1.75 |

| Example | Avg. Pressure Article is Subjected to (Mpa) | Adhesive or Substrate Failure |
| --- | --- | --- |
| 1-a | 3.7 | Substrate |
| 1-b | 2.8 | Substrate |
| 1-c | 3.1 | Substrate |
| 1-d | X | Substrate |
| 1-e | 2.8 | Adhesive |
| Average (1-a to 1-e) | 3.1 | |

Discussion: Samples 1-4 all failed by cohesive failure in the polyetherimide (ULTEM®) plaque. Sample 5 failed adhesively between the epoxy layer and the Al and PEI. Our results show that the polycarbonate copolymer exhibited useful adhesive properties.

Examples 2a-2e

The articles of Examples 2(a)-2(e) were made in accordance to the techniques and procedures described above in section "2" of the Techniques & Procedure, i.e. at "High Temperature" conditions. The strength required to make layers of the articles separate was determined as indicated above. We observed whether the failures that occurred was (i) an adhesive failure (where substrates of the articles separated from the adhesive and the separated substrate remained intact or (ii) cohesive (substrate) failure (where at least one substrate fractured or did not remain intact). The following tables summarize the construction of the articles and results.

| Sample | Sample Construction | Thickness (mm) |
| --- | --- | --- |
| 2 | polyetherimide (ULTEM ®) Film | 0.13 |
|   | polycarbonate copolymer (LEXAN ® FST) Film XH 6050 | 0.08 3.13 |

| Example | Avg. Pressure Article is Subjected to (Mpa) | Adhesive or Substrate Failure |
| --- | --- | --- |
| 2-a | 4.3 | Substrate |
| 2-b | 4.3 | Substrate |
| 2-c | 4.3 | Substrate |
| 2-d | 4.1 | Substrate |
| 2-e | X | Substrate |
| Average (2-a to 2-e) | 4.3 | |

Discussion: Our results show that the polycarbonate copolymer exhibited useful adhesive properties. Sample 1 failed cohesively in the LEXAN® FST all others ruptured the XH 6050 resin substrate.

Examples 3a-3e

The articles of Examples 3(a)-3(e) were made in accordance to the techniques and procedures described above in section "3" of the Techniques & Procedures, i.e. at "Low Temperature" conditions. The strength required to make layers of the articles separate was determined as indicated above. We observed whether the failures that occurred was (i) an adhesive failure (where substrates of the articles separated from the adhesive and the separated substrate remained intact or (ii) cohesive (substrate) failure (where at least one substrate fractured or did not remain intact). The following tables summarizes the construction of the articles and results.

| Sample | Sample Construction | Thickness (mm) |
| --- | --- | --- |
| 3 | polyetherimide (ULTEM ® 1000) Film | 0.13 |
|   | polycarbonate copolymer (LEXAN ® FST) Film | 0.08 |
|   | Glass reinforced polyetherimide (ULTEM ®) | 1.00 |

| Example | Avg. Pressure Article is Subjected to (Mpa) | Adhesive or Substrate Failure |
| --- | --- | --- |
| 3-a | 6.4 | Substrate Failure |
| 3-b | 4.4 | Substrate Failure |
| 3-c | 4.4 | Substrate |
| 3-d | 6.8 | Substrate |
| 3-e | 4.2 | Substrate |
| Average (3-a to 3-e) | 5.2 | |

Discussion: All failures occurred in the epoxy layers. Our results show that the polycarbonate copolymer exhibited useful adhesive properties.

Examples 5a-5e

The articles of Examples 5(a)-5(e) were made in accordance to the techniques and procedures described above in section "5" of the Techniques & Procedures, i.e. at "Low Temperature" conditions. The strength required to make layers of the articles separate was determined as indicated above. We observed whether the failures that occurred was (i) an adhesive failure (where substrates of the articles separated from the adhesive and the separated substrate remained intact or (ii) cohesive (substrate) failure (where at least one substrate fractured or did not remain intact). The following tables summarize the construction of the articles and results.

| Sample | Sample Construction | Thickness (mm) |
|---|---|---|
| 5 | polyetherimide (ULTEM ® 1000) Film | 0.13 |
|   | polycarbonate copolymer (LEXAN ® FST) Film | 0.08 |
|   | polyetherimide (ULTEM ® XP 060) Foam | 2.54 |

| Example | Avg. Pressure Article is Subjected to (Mpa) | Adhesive or Substrate Failure |
|---|---|---|
| 5-a | 3.0 | Substrate Failure |
| 5-b | 4.2 | Substrate Failure |
| 5-c | 4.4 | Substrate |
| 5-d | 4.0 | Substrate |
| 5-e | 5.0 | Substrate |
| Average (5-a to 5-e) | 4.1 | |

Discussion: The polyetherimide (ULTEM®) Foam failed cohesively in all cases. Our results show that the polycarbonate copolymer exhibited useful adhesive properties.

Examples 6a-6e

The articles of Examples 6(a)-6(e) were made in accordance to the techniques and procedures described above in Section "6" of the Techniques & Procedures, i.e. at "High Temperature" conditions. The strength required to make layers of the articles separate was determined as indicated above. We observed whether the failures that occurred was (i) an adhesive failure (where substrates of the articles separated from the adhesive and the separated substrate remained intact or (ii) cohesive (substrate) failure (where at least one substrate fractured or did not remain intact). The following tablessummarize the construction of the articles and results.

| Sample | Sample Construction | Thickness (mm) |
|---|---|---|
| 6 | polyetherimide (ULTEM ® 1000) IM Plaque | 0.07 |
|   | polycarbonate copolymer (LEXAN ® FST) Film | 0.08 |
|   | KAPTON ® Film | 0.13 |

| Example | Avg. Pressure Article is Subjected to (Mpa) | Adhesive or Substrate Failure |
|---|---|---|
| 6-a | 0.0 | Substrate Failure |
| 6-b | 0.0 | Substrate Failure |
| 6-c | 0.0 | Substrate |
| 6-d | 0.0 | Substrate |
| 6-e | 0.0 | Substrate |
| Average (6-a to 6-e) | 0.0 | |

Discussion: No measurable adhesion of polycarbonate copolymer (LEXAN® FST) to KAPTON® film under these conditions. Our results show that the polycarbonate copolymer did not exhibit useful adhesive properties.

Examples 7a-7e

The articles of Examples 7(a)-7(e) were made in accordance to the techniques and procedures described above in section "7" of the Techniques & Procedures, i.e. at "Low Temperature" conditions. The strength required to make layers of the articles separate was determined as indicated above. We observed whether the failures that occurred was (i) an adhesive failure (where substrates of the articles separated from the adhesive and the separated substrate remained intact or (ii) cohesive (substrate) failure (where at least one substrate fractured or did not remain intact). The following tables summarize the construction of the articles and results.

| Sample | Sample Construction | Thickness (mm) |
|---|---|---|
| 7 | polyetherimide (ULTEM ® 1000) IM Plaque | 1.75 |
|   | polycarbonate copolymer (LEXAN ® FST) Film | 0.08 |
|   | polyetherimide (ULTEM ® 1000) IM Plaque | 1.75 |

| Example | Avg. Pressure Article is Subjected to (Mpa) | Adhesive or Substrate Failure |
|---|---|---|
| 7-a | 4.5 | Substrate Failure |
| 7-b | 5.4 | Substrate Failure |
| 7-c | 5.6 | Substrate |
| 7-d | 3.9 | Substrate |
| 7-e | 6.9 | Substrate |
| Average (7-a to 7-e) | 5.3 | |

Discussion: Sample one failed cohesively in the LEXAN® FST resin layer. All others failed in the polyetherimide (ULTEM®) layer. Our results show that the polycarbonate copolymer exhibited useful adhesive properties.

Examples 8A(a-e)

The articles of Examples 8A(a)-8A(e) were made in accordance to the techniques and procedures described above in section "8" of the Techniques & Procedures, i.e. at "High Temperature" conditions. The strength required to make layers of the articles separate was determined as indicated above. We observed whether the failures that occurred was (i) an adhesive failure (where substrates of the articles separated from the adhesive and the separated substrate remained intact or (ii) cohesive (substrate) failure (where at least one substrate fractured or did not remain intact). The following tablessummarize the construction of the articles and results.

| Sample | Sample Construction | Thickness (mm) |
|---|---|---|
| 8A | Amorphous PEEK | 0.25 |
|   | polycarbonate copolymer (LEXAN ® FST) Film | 0.08 |
|   | polyetherimide (ULTEM ® 1000) Injection | 1.75 |

-continued

| Sample | Sample Construction | Thickness (mm) |
|---|---|---|
| | Molded Plaque | |
| | polycarbonate copolymer (LEXAN ® FST) Film | 0.08 |

| Example | Avg. Pressure Article is Subjected to (Mpa) | Adhesive or Substrate Failure |
|---|---|---|
| 8A-a | 0.0 | Substrate Failure |
| 8A-b | 0.0 | Substrate Failure |
| 8A-c | 0.0 | Substrate |
| 8A-d | 0.0 | Substrate |
| 8A-e | 0.0 | Substrate |
| Average (8A-a to 8A-e) | 0.0 | |

Discussion: No measurable adhesion of polycarbonate copolymer (LEXAN®) to PEEK under these conditions. Our results show that the polycarbonate copolymer did not exhibit useful adhesive properties.

Examples 8B(a-e)

The articles of Examples 8B(a)-8B(e) were made in accordance to the techniques and procedures described above in section "8" of the Techniques & Procedures, i.e. at "High Temperature" conditions. The strength required to make layers of the articles separate was determined as indicated above. We observed whether the failures that occurred was (i) an adhesive failure (where substrates of the articles separated from the adhesive and the separated substrate remained intact or (ii) cohesive (substrate) failure (where at least one substrate fractured or did not remain intact). The following tables summarize the construction of the articles and results.

| Sample | Sample Construction | Thickness (mm) |
|---|---|---|
| 8B | Crystalline PEEK | 0.25 |

| Example | Avg. Pressure Article is Subjected to (Mpa) | Adhesive or Substrate Failure |
|---|---|---|
| 8B-a | 0.0 | Substrate Failure |
| 8B-b | 0.0 | Substrate Failure |
| 8B-c | 0.0 | Substrate |
| 8B-d | 0.0 | Substrate |
| 8B-e | 0.0 | Substrate |
| Average (8B-a to 8B-e) | 0.0 | |

Discussion: No measurable adhesion of polycarbonate copolymer (LEXAN®) FST) to PEEK under these conditions. Our results show that the polycarbonate copolymer did not exhibit useful adhesive properties.

Examples 9(a-e)

The articles of Examples 9(a)-(e) were made in accordance to the techniques and procedures described above in section "9" of the Techniques & Procedures, i.e. at "Low Temperature" conditions. The strength required to make layers of the articles separate was determined as indicated above. We observed whether the failures that occurred was (i) an adhesive failure (where substrates of the articles separated from the adhesive and the separated substrate remained intact or (ii) cohesive (substrate) failure (where at least one substrate fractured or did not remain intact). The following tables summarize the construction of the articles and results.

| Sample | Sample Construction | Thickness (mm) |
|---|---|---|
| 9 | polyetherimide (ULTEM ® 1000) Film | 0.13 |
| | polycarbonate copolymer (LEXAN ® FST) Film | 0.08 |
| | Cetex (TenCate) 1.5 | 0.33 |

| Example | Avg. Pressure Article is Subjected to (Mpa) | Adhesive or Substrate Failure |
|---|---|---|
| 9-a | 6.9 | Substrate Failure |
| 9-b | 6.0 | Substrate Failure |
| 9-c | 3.7 | Substrate |
| 9-d | 7.8 | Substrate |
| 9-e | 7.6 | Substrate |
| Average (9-a to 9-e) | 6.4 | |

Discussion: All samples failed in the polyetherimide (ULTEM®) film, except sample #5, which failed in the polycarbonate copolymer (LEXAN® FST) layer. Our results show that the polycarbonate copolymer exhibited useful adhesive properties.

Examples 10(a-e)

The articles of Examples 10(a)-(e) were made in accordance to the techniques and procedures described above in section "10" of the Techniques & Procedures, i.e. at "High Temperature" conditions. The strength required to make layers of the articles separate was determined as indicated above. We observed whether the failures that occurred was (i) an adhesive failure (where substrates of the articles separated from the adhesive and the separated substrate remained intact or (ii) cohesive (substrate) failure (where at least one substrate fractured or did not remain intact). The following tables summarize the construction of the articles and results:

| Sample | Sample Construction | Thickness (mm) |
|---|---|---|
| 10 | polyetherimide (ULTEM ® 1000) Film | 0.13 |
| | polycarbonate copolymer (LEXAN ® FST) Film | 0.08 |
| | polyetherimide copolymer (EXTEM ® HU 1004) | 3.13 |

| Example | Avg. Pressure Article is Subjected to (Mpa) | Adhesive or Substrate Failure |
|---|---|---|
| 10-a | 3.3 | Substrate Failure |
| 10-b | 1.6 | Substrate Failure |
| 10-c | 1.4 | Substrate |

-continued

| Example | Avg. Pressure Article is Subjected to (Mpa) | Adhesive or Substrate Failure |
|---|---|---|
| 10-d | 0.9 | Substrate |
| 10-e | 2.3 | Substrate |
| Average (10-a to 10-e) | 1.9 | |

Discussion: All samples failed cohesively in the polyetherimide copolymer (EXTEM® HU 1004) layer. Our results show that the polycarbonate copolymer exhibited useful adhesive properties.

Examples 12(a-e)

The articles of Examples 12(a)-(e) were made in accordance to the techniques and procedures described above in section "12" of the Techniques & Procedures, i.e. at "Low Temperature" conditions. The strength required to make layers of the articles separate was determined as indicated above. We observed whether the failures that occurred was (i) an adhesive failure (where substrates of the articles separated from the adhesive and the separated substrate remained intact or (ii) cohesive (substrate) failure (where at least one substrate fractured or did not remain intact). The following tables summarize the construction of the articles and results:

| Sample | Sample Construction | Thickness (mm) |
|---|---|---|
| 12 | polyetherimide (ULTEM ® 1000) Film | 0.13 |
| | polycarbonate copolymer (LEXAN ® FST) Film | 0.08 |
| | IM carbon reinforced polyetherimide (ULTEM ®) | 2.00 |

| Example | Avg. Pressure Article is Subjected to (Mpa) | Adhesive or Substrate Failure |
|---|---|---|
| 12-a | X | Substrate Failure |
| 12-b | 2.9 | Substrate Failure |
| 12-c | 3.0 | Substrate |
| 12-d | 2.4 | Substrate |
| 12-e | 2.0 | Substrate |
| Average (12-a to 12-e) | 2.6 | |

Discussion: All samples failed adhesively at the aluminum then progressed through the FST, polyetherimide (ULTEM®) film and into the plaque. Our results show that the polycarbonate copolymer exhibited useful adhesive properties.

Although the present invention has been described in considerable detail with reference to certain preferred versions thereof, other versions are possible. Therefore, the spirit and scope of the appended claims should not be limited to the description of the preferred versions contained herein.

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Any element in a claim that does not explicitly state "means for" performing a specified function, or "step for" performing a specific function, is not to be interpreted as a "means" or "step" clause as specified in 35 U.S.C §112, sixth paragraph. In particular, the use of "step of" in the claims herein is not intended to invoke the provisions of 35 U.S.C. §112, sixth paragraph.

We claim:

1. An aircraft component comprising:
   (a) at least a first polyimide substrate in the form of a polyimide foam;
   (b) at least a second polyimide substrate in the form of a polyimide foam; and
   (c) an adhesive bonded to and between the first substrate of polyimide foam and the second substrate of polyimide foam,
   wherein the aircraft component has a 2 minute integrated heat release rate of less than or equal to 65 kilowatt-minutes per square meter (kW–min/m2) and a peak heat release rate of less than 65 kilowatts per square meter (kW/m2) as measured using the method of FAR F25.4, in accordance with Federal Aviation Regulation FAR 25.853(d), wherein the adhesive is a hot-melt adhesive comprising a polycarbonate copolymer comprising reacted resorcinol, siloxane, and bisphenol-A.

2. The aircraft component of claim 1, wherein the aircraft component is at least one selected from the group consisting of radomes, fuselages, wings, structured cores, stow bins, galley panels, lavatory walls, dividers, aircraft passenger seats and structured panels.

3. The aircraft component of claim 1, wherein the aircraft component is one selected from a group consisting of two stow bins, galley panels, lavatory walls, aircraft passenger seats, structured panels and dividers.

4. The aircraft component of claim 1, further comprising a sensor between the first polyimide substrate and the second polyimide substrate.

5. The air craft component of claim 1, wherein the adhesive further comprises reinforcing fiber.

6. A laminated article comprising:
   (a) a first laminae comprising a first polyimide foam substrate;
   (b) a second laminae comprising a second polyimide foam substrate;
   (c) a third laminae comprising a polycarbonate copolymer which is a reacted resorcinol, siloxane, and bisphenol-A
   wherein the third laminae possesses adhesive properties sufficient to bond to each of said first and said second laminae to form the laminated article; and,
   wherein the laminated article has a 2 minute integrated heat release rate of less than or equal to 65 kilowatt-minutes per square meter (kW–min/m2) and a peak heat release rate of less than 65 kilowatts per square meter (kW/m2) as measured using the method of FAR F25.4, in accordance with Federal Aviation Regulation FAR 25.853(d).

7. The laminated article of claim 6, wherein neither of the first and the second laminae comprise a poly(4-4'-oxydiohenylene-pyromellitimide).

8. The laminated article of claim 6, further comprising a sensor between the first polyimide substrate and the second polyimide substrate.

9. The laminated article of claim 6, wherein the third laminae further comprises reinforcing fibers.

* * * * *